United States Patent [19]

Lyerly et al.

[11] Patent Number: 5,027,488
[45] Date of Patent: Jul. 2, 1991

[54] POSITIONING DEVICE FOR A WORKPIECE AND METHOD

[75] Inventors: Larry L. Lyerly; Richard A. Osman, both of Florence, S.C.

[73] Assignee: Atlantic Tooling and Fabricating Co., Inc., Quinby, S.C.

[21] Appl. No.: 549,550

[22] Filed: Jul. 9, 1990

Related U.S. Application Data

[63] Continuation-in-part of Ser. No. 334,627, Apr. 7, 1989, abandoned.

[51] Int. Cl.⁵ ............................................. B23Q 7/00
[52] U.S. Cl. ...................................... 29/33 P; 29/563; 29/784; 198/345.1; 198/346.1; 198/465.1; 269/81
[58] Field of Search ............... 29/33 P, 563, 559, 784, 29/430; 198/345, 346.1, 465.1, 465.2; 269/69, 70, 74, 81, 289 MR, 309

[56] References Cited

U.S. PATENT DOCUMENTS

| | | | |
|---|---|---|---|
| 3,988,014 | 10/1976 | Worden | 269/74 X |
| 4,014,428 | 3/1977 | Ossbahr | 198/345 |
| 4,449,277 | 5/1984 | Hasegawa et al. | 198/346.1 X |
| 4,583,631 | 4/1986 | Yonezawa et al. | 198/465.1 X |

*Primary Examiner*—Joseph M. Gorski
*Attorney, Agent, or Firm*—Cushman, Darby & Cushman

[57] ABSTRACT

A set of positioning guide members are mounted on a worktable to delimit receiving areas for a workpiece support plate so that the support plate may be accurately positioned at each workstation on the table to allow accurate machining to be effected; a locking device is provided at each workstation to lock the support plate in a selected position in alignment with a tool at each workstation.

5 Claims, 3 Drawing Sheets

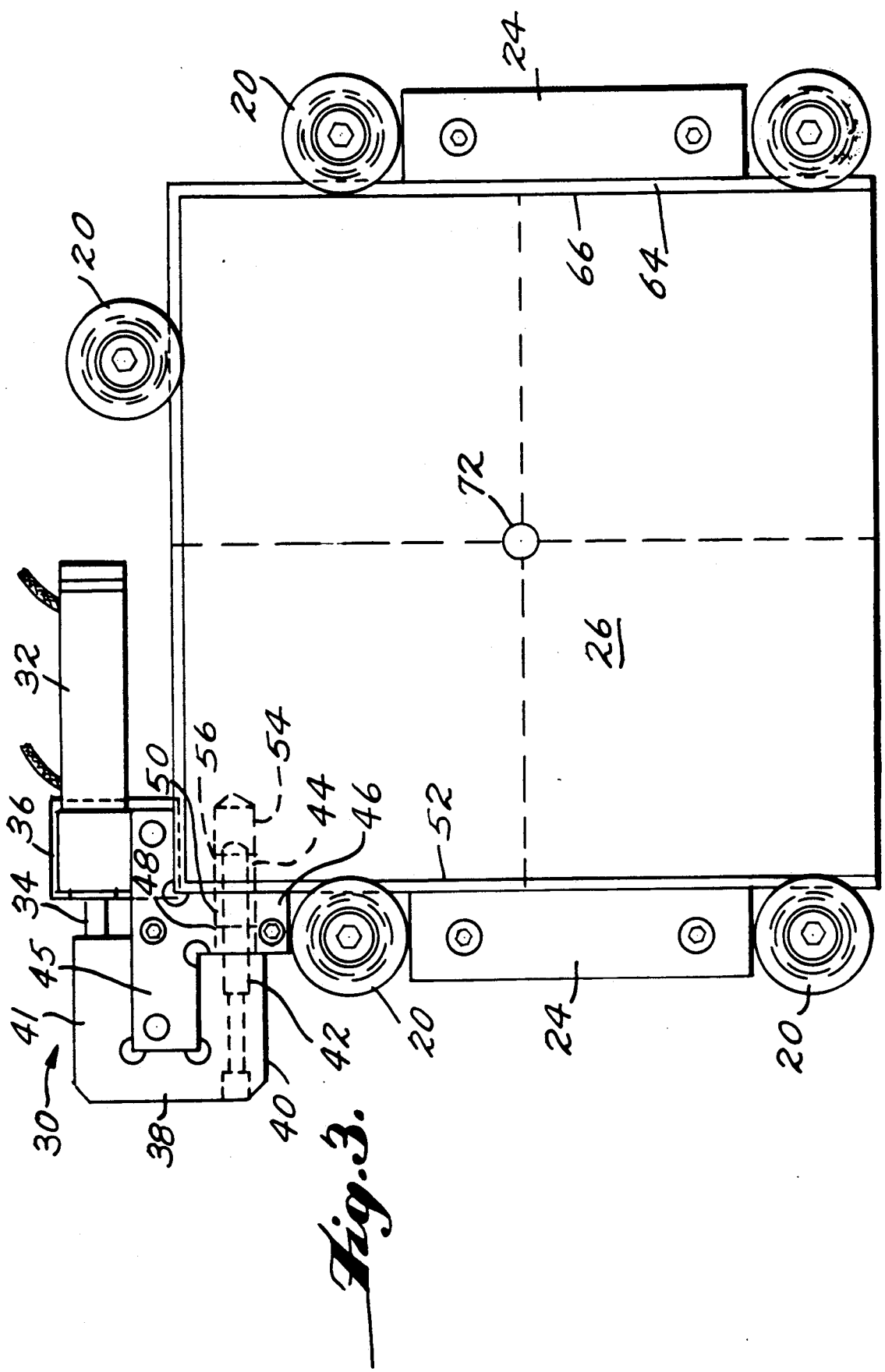

POSITIONING DEVICE FOR A WORKPIECE AND METHOD

This is a continuation-in-part (CIP) of application Ser. No. 07/334,627 filed on Apr. 7, 1989 which was abandoned.

FIELD OF THE INVENTION

The present invention pertains to devices for positioning one or more workpieces relative to a forming tool or tools and a method of using the devices to reduce the setup time required to carry out each step of a multi-step forming operation on each workpiece.

BACKGROUND OF THE INVENTION

Description of the Prior Art

In the use of forming tools such as milling machines and metal drills and the like, it has been the practice to mount the tool on a support that enabled the tool to be oriented by an operator in selected positions to carry out forming operations on a stationary workpiece. This procedure permitted the workpiece to be fastened in place for substantial stability throughout the forming operations. However, the expense of the tools and its positioning mechanisms as the complexity of the work to be performed increases also increased or the durability of the tools and associated positioning supports was sacrificed for greater flexibility in the use of the tools.

To offset these disadvantages, multi-station work stations have been employed where the workpiece is shifted manually or by a conveyor system from one station to another and separate forming operations are carried out at each station. In such arrangements, the precision of the forming work often depends on the accuracy of placement and securement of each workpiece in each station which steps may consume considerable labor and/or capital investment corresponding to the exactness demanded by the task at hand.

SUMMARY OF THE INVENTION

The present invention provides a positioning device that can readily be employed with any number of work stations and with relatively small expense will provide substantially exact positioning of a workpiece relative to a forming tool at each station with significantly less operator time consumed in the positioning task.

In one embodiment, at each work station which will include a forming tool, such as a rotary milling tool or drill, guide members are secured to a work table or platform to define a receiving area for one workpiece support member such as a rigid plate having dimensions so as to cooperate with the guide members to position the support member in an approximate position relative to the tool. Each workstation also is provided with a locking device which is actuated after the support member is positioned by the guide members to engage and lock the support member in an exact position relative to the guide members and the tool.

Prior to commencing a forming operation, the workpiece is releasably secured to the support member in a selected position for working at a number of workstations. Once so secured to the support member, the assembly comprising the workpiece and support member is shifted from workstation to workstation either manually or by a conveyor system without loss of precision in locating the workpiece relative to the tool at each station thereby substantially reducing the set-up time previously required. For greater working facility, an intermediate support member may be employed which is releasably fastened to the main support member and which will allow quick alteration in the position of the workpiece carried thereby.

These and other advantages will become apparent from the following description in conjunction with the accompanying drawings, in which:

BRIEF DESCRIPTION OF THE DRAWINGS

FIG. 3 is a top plan view of a single positioning device of FIGS. 1 and 2; and

DETAILED DESCRIPTION

Figure 1:
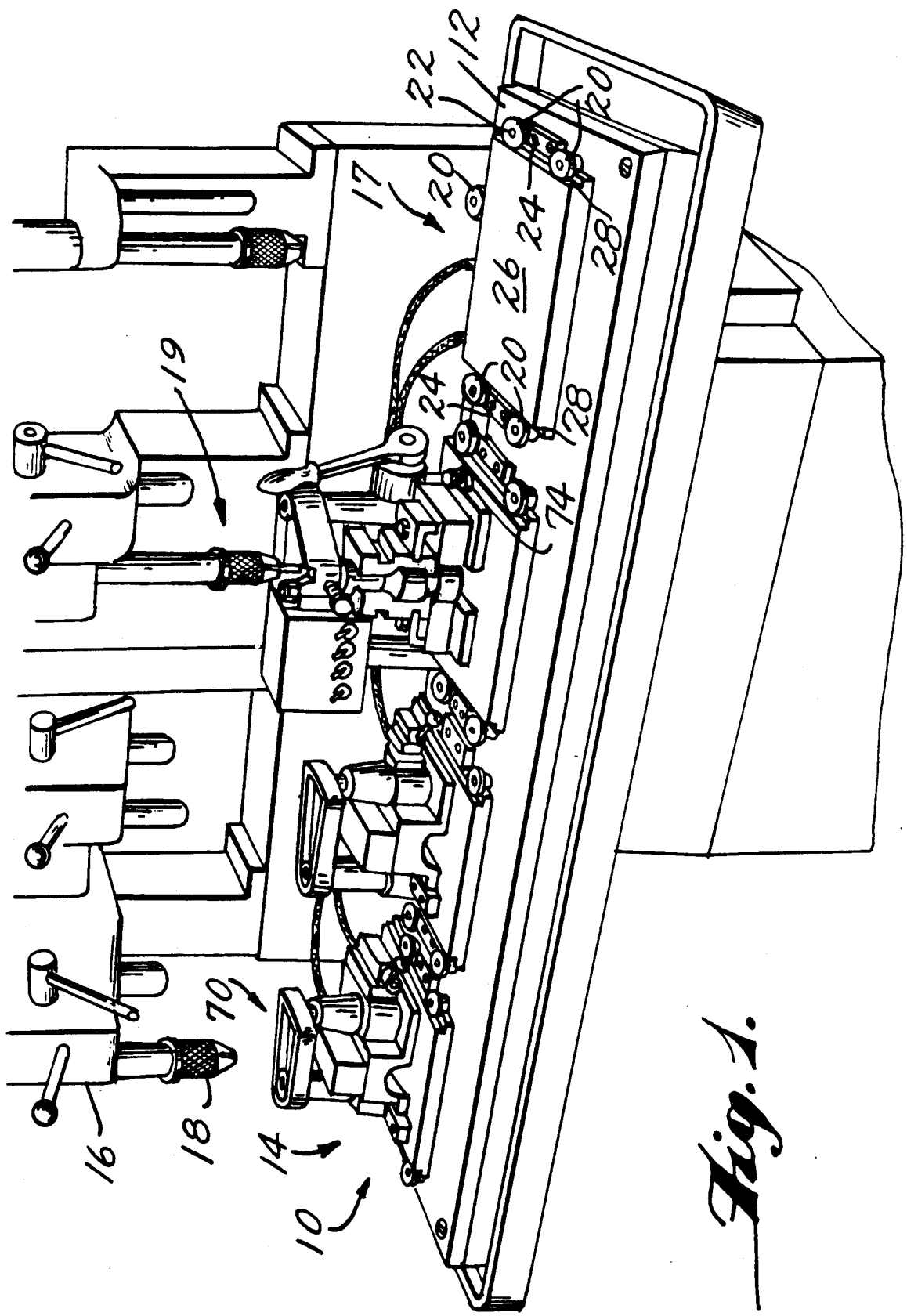
FIG. 1 is a perspective view of a work table having four work stations each provided with the positioning device of this invention.

Referring now to the drawings wherein like numerals designate corresponding parts throughout the several views, there is shown in FIG. 1 a perspective view of the device of the present invention 10 and which comprises a platform or worktable 12 having four work stations one of which is indicated at 14 and another at 17. Each work station will be located generally vertically below a drill press such as at 19. According to the present invention, each drill press should be of the type that will enable an operator to insert a variety of different tools in each drill bit 18 to carry out a desired forming operation on a workpiece which will be located in the subjacent work station. While the illustration of FIG. 1 represents four separate work stations for the table 12, it will be understood that any number of work stations may be employed depending on the complexity of the operations to be performed on a selected workpiece. The present invention is particularly adapted to eliminate set up time for a relatively complicated workpiece on which a number of different milling operations are to be carried out at the separate work stations such as the four work stations of FIG. 1.

To facilitate the foregoing, the present invention provides, at each work station 14, a set of guide members which are more clearly illustrated at work station 17, it being understood that the guide members are identically oriented for each of the preceding work stations. At work station 17, retaining guide members 20 are releasably fastened to the platform 12 preferably by threaded bolts 22. The guide members 20 are arranged to define on the platform 12 a receiving area which further has its sides delimited by rectangular bars 24 two of which are releasably secured to the upper surface of the platform 12 between paris of side guide members 20 as illustrated. The guide members 20 and bars 24 define the receiving area for a rectangular plate 26 which has three of its side edges provided with a stepped formation 28 to facilitate cooperation with the guide members 20 and bars 24 as described below.

Figure 2:
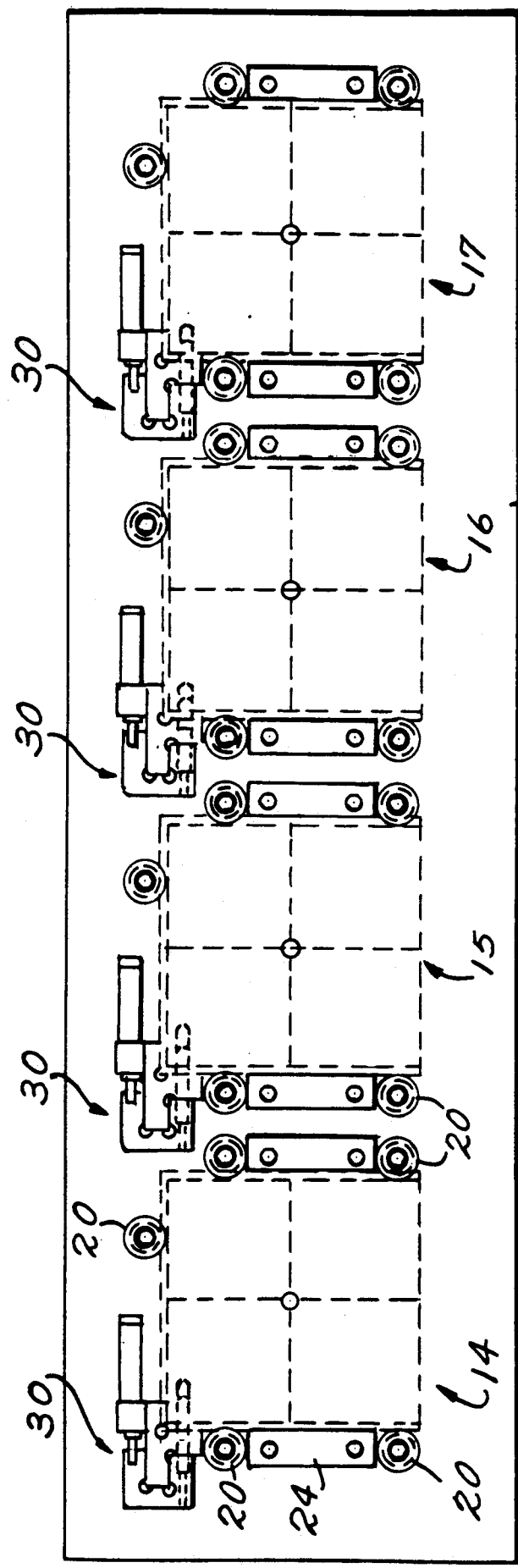
FIG. 2 is top plan view of the work table of FIG. 1.

With reference now to FIG. 2, each work station 14-17 on the work table 12 is provided with a locking device 30 for engaging and locking in place the support member plate 26 after the respective support plate 26 has been inserted into the receiving area defined by the guide members 20 and bar members 24. Each of the work stations, as will be apparent, is provided with an identical configuration of guide members 20 and 24 and locking devices 30 so that each work station can precisely locate and lock in place a received support member plate 26.

With reference now to FIG. 3, there is shown a detailed plan view of a single work station with a support plate member 26 in position. The locking device 30 preferably includes air or hydraulic fluid actuated cylinder 32 having a piston located therein movable in a longitudinal direction of the cylinder 32. A piston rod 34 extends from one face of the piston in the cylinder 32. The piston and cylinder arrangement may be securely mounted on the platform 12 by a suitable bracket 36 to prevent any movement of the cylinder 32 during its operation. The free end of the piston rod 34 is securely fastened by screwing in a threaded bolt to a U-shaped guide member 38 with one leg 41 of the U being secured to the piston rod and the opposite leg 40 being provided with a bore 42 in which is securely mounted a locking pin 44 so as to be movable with member 38. A T-shaped guide block 45 is securely mounted on the surface of the platform 12 and has one leg which snugly interfits with the space between the legs of the U-shape guide member 38 while a transverse leg 46 is provided with a through bore 48 through which extends the locking pin 44 during its operation. Within the bore 48, a first bushing 50 is located which engages and closely guides the locking pin 44 during its traversing movement. The side wall 52 of the support member plate 26 is provided with a bore 54 which is also provided with a bushing 56 securely mounted therein for receiving and closely interfitting with the exterior surface of the locking pin 44 upon actuation of the cylinder 32. With this arrangement, repeated operation of the cylinder 32 can be effected without causing undue stress on the piston rod or locking pin 44 by virtue of the reinforced protection against deflection during operation provided by the guide member 38 cooperating with the T-shaped block 45 and by the provision of the respective bushings 48 and 56.

Figure 4:
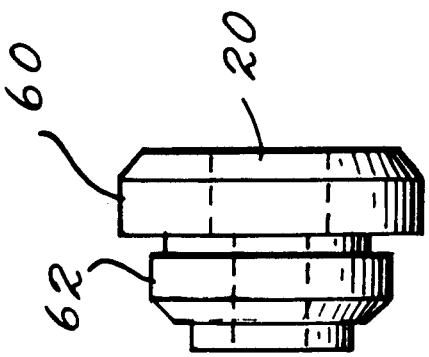
FIG. 4 is an elevational view of one of the guide members of the invention.

Turning now to FIG. 4, there is illustrated a side elevational view of one of the guide members 20 of the present invention. As shown, the guide member 20 is provided at its upper end with an enlarged head 60 having a selected diameter and an enlarged peripheral abutment surface 62 of smaller diameter than the head 60. Preferably the abutment surface 62 and the head 60 are circular in plan view to facilitate the sliding engagement of the surfaces with the stepped side surfaces of the support plate member 26. These guide members 20 may, if desired, be rotatably mounted on the platform. The other guide elements, the bars 24 are positioned on the platform 12 to engage the lower step of the side edge of the plate 26 while the set back side edge 66 engages the enlarged head 60 of each of the guide members 20.

With the foregoing arrangement, an operator will first secure to the support plate member 26 a workpiece such as that schematically illustrated at 70 in FIG. 1. For this purpose, one or more bores 72 may be provided in the plate 26 in any desired number and orientation to facilitate attachment of the workpiece thereto such as by a threaded bolt 74. The positioning of the workpiece on the support member plate 26 will, of course, depend on the sequence of operations to be carried out at each of the work stations and the type of tool to be employed at each work station. As an example, a first work station may employ a ball end milling tool to form a relatively rough cavity in the surface of a workpiece whereas the second work station may be provided with a finer grade cutting tool to finish the surface provided by the ball end cutting tool of the first work station. Having planned the sequence of operations through the various work stations, a single mounting of a workpiece on its associated support plate member 26 will enable an operator to simply complete one operation at a first work station and then move the workpiece and the associated support member plate affixed thereto to a second work station where the support plate member will be inserted by sliding into the receiving area defined by the guide members 20 and bars 24 until the bore 54 is in at least rough alignment with the bore 48 in member 45. The operator will then actuate the fluid pressure cylinder 32 whereupon the pin 44 will be inserted into the bushing 56 in bore 54 of the support plate member 26 to both engage and bring into precise alignment the support plate member 26 and to lock the support plate member 26 in position relative to the receiving area and the tool located thereabove. While in many cases, the guide members 20 and bars 24 can effect adequate positioning of the support plate member 26 and workpiece in position relative to the tool, the locking device 30 will assure precise alignment and guard against any movement of the support plate during a forming operation with an associated tool.

Having described the invention, the method of use will be readily apparent as well as numerous modifications to those skilled in this art. For example, while the locking device 30 has been described in connection with a fluid pressure system, air or hydraulic cylinders can be readily employed depending on the weight of the workpiece for a number of different operations. Also, intermediate support members may be employed to provide greater facility in positioning a complicated workpiece relative to the tools of the various work stations. Additionally, each of the sides of the support plate member 26 may be provided with the stepped arrangement and the plates themselves may be square thus permitting rotation of a plate from work station to work station to provide greater facility in positioning relative to a tool of any given work station.

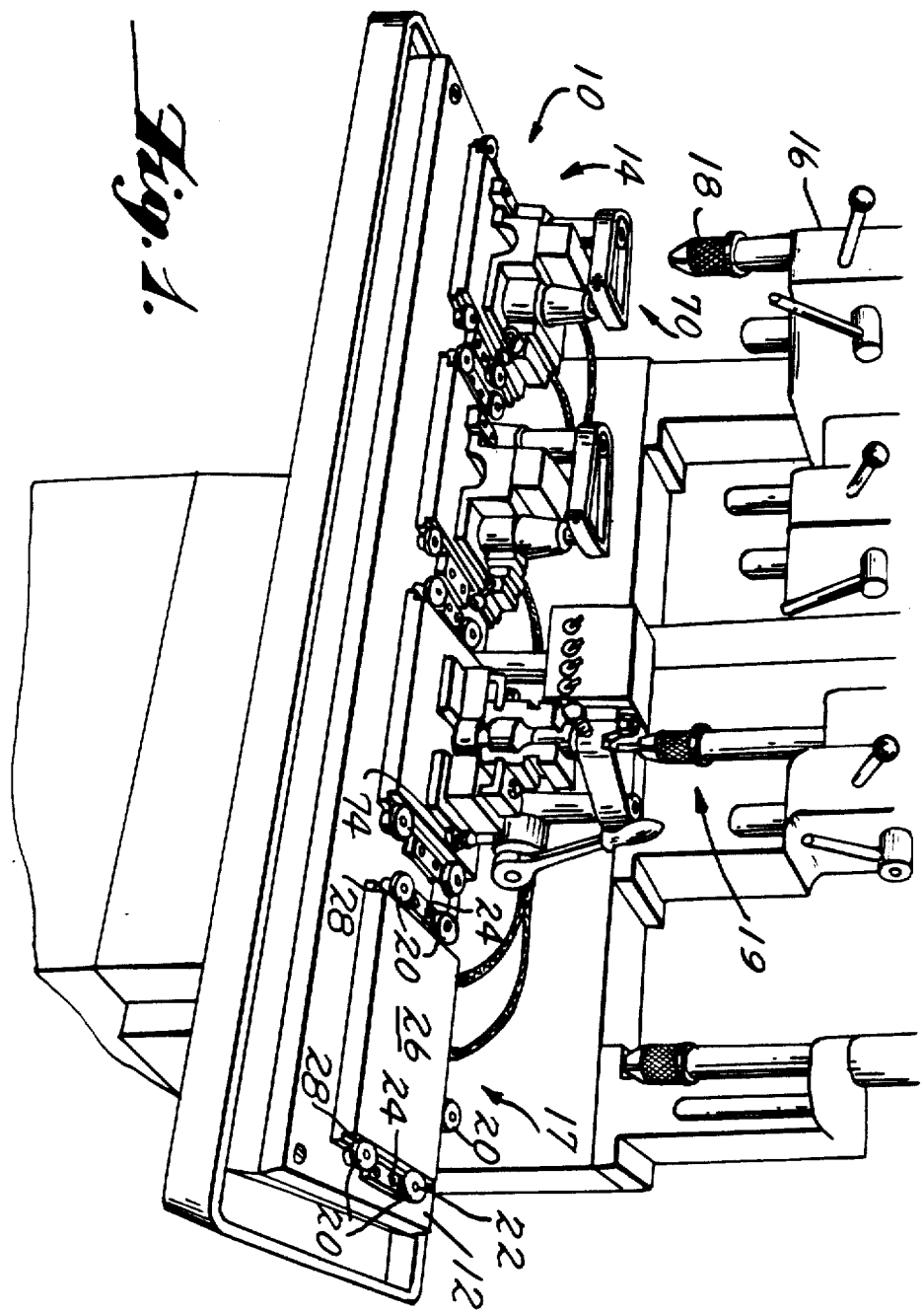

We claim:

1. A positioning device for positioning a workpiece in a predetermined alignment relative to tool means of a type for carrying out a forming operation on the workpiece, comprising:

workpiece mounting means, means for engaging by sliding contact said mounting means to which the workpiece is secured;

said engaging means being operative in one mode to receive said mounting means into a predetermined position, to place said workpiece in the predetermined alignment relative to the tool means;

locking means for releasably locking said mounting means in said predetermined position to maintain said workpiece in said predetermined alignment, and for unlocking a locked mounting means for allowing movement from said predetermined position;

said engaging means including a platform and guide means mounted on said platform disposed to define a receiving area for said mounting means, said mounting means comprising a support plate having opposed sides which engage said guide means when said support plate is received in said receiving area;

said locking and unlocking means including a pin and said support plate including, on one of said sides thereof, an aperture for receiving said pin, said locking and unlocking means including pressure actuated means movable between a first position where said pin is withdrawn from said receiving area to an unlocking position and a second position where said pin is moved into said receiving area and will be inserted into said aperture of said support plate in a locking position when said support plate is disposed in said receiving area in said predetermined position;

said locking means further comprising a "U" shaped member movably cooperating with a "T" shaped member which is fixedly attached to said platform, said "T" shaped member having a central leg portion with a bore extending therethrough; and said pin being fixed to one leg of said "U" shaped member and passing through the bore in the central leg portion of said "T" shaped member when the pin is withdrawn from or moved into said receiving area.

2. The invention as recited in claim 1 wherein said bore of said central leg portion of said "T" shaped member is provided with an annular bushing through which said pin extends upon movement between said locking and unlocking positions.

3. The invention as recited in claim 2 wherein said aperture in said one side of said support plate is circular in cross-section and an annular bushing means is disposed therein for receiving said pin of said locking means.

4. A positioning device for positioning a workpiece in a predetermined alignment relative to tool means of a type for carrying out a forming operation on the workpiece, comprising:

workpiece mounting means, means for, engaging by sliding contact said mounting means to which the workpiece is secured;

said engaging means being operative in one mode to receive said mounting means into a predetermined position, to place said workpiece in the predetermined alignment relative to the tool means;

locking means for releasably locking said mounting means in said predetermined position to maintain said workpiece in said predetermined alignment, and for unlocking a locked mounting means for allowing movement from said predetermined position;

said engaging means including a platform and guide means mounted on said platform disposed to define a receiving area for said mounting means, said mounting means comprising a support plate having opposed sides which engage said guide means when said support plate is received in said receiving area;

said locking and unlocking means including a pin and said support plate including, on one of said sides thereof, an aperture for receiving said pin, said locking and unlocking means including pressure actuated means movable between a first position where said pin is withdrawn from said receiving area to an unlocking position and a second position where said pin is moved into said receiving area and will be inserted into said aperture of said support plate in a locking position when said support plate is disposed in said receiving area in said predetermined position;

said guide means comprising circular disk members positioned on said platform for contacting said support plate to guide the sliding thereof into said receiving area; said disk members being each formed with a head portion of a selected diameter and a base portion having a diameter smaller than said selected diameter and said sides of said support plate being provided with a stepped formation having a lower portion that protrudes relative to an upper portion with said lower portion having a width so as to be insertable beneath said head portions of said disk members when said support plate is received into said receiving area.

5. A positioning device for positioning a workpiece in a predetermined alignment relative to tool means of a type for carrying out a forming operation on the workpiece, comprising:

workpiece mounting means, means for engaging by sliding contact said mounting means to which the workpiece is secured;

said engaging means being operative in one mode to receive said mounting means into a predetermined position, to place said workpiece in the predetermined alignment relative to the tool means;

locking means for releasably locking said mounting means in said predetermined position to maintain said workpiece in said predetermined alignment, and for unlocking a locked mounting means for allowing movement from said predetermined position;

said engaging means including a platform and guide means mounted on said platform disposed to define a receiving area for said mounting means, said mounting means comprising a support plate having opposed sides which engage said guide means when said support plate is received in said receiving area;

said guide means comprising circular disk members positioned on said platform for contacting said support plate to guide the sliding thereof into said receiving area; said disk members being each formed with a head portion of a selected diameter and a base portion having a diameter smaller than said selected diameter, said base portion being mounted closer to said platform than said head portion and said sides of said support plate being provided with a stepped formation having a first portion that protrudes relative to a second portion with said first portion having a width so as to be insertable beneath said head portions of said disk members when said support plate is received into said receiving area.

* * * * *

UNITED STATES PATENT AND TRADEMARK OFFICE
CERTIFICATE OF CORRECTION

PATENT NO. : 5,027,488

DATED : July 2, 1991

INVENTOR(S) : Larry L. Lyerly et al

It is certified that error appears in the above-identified patent and that said Letters Patent is hereby corrected as shown below:

Sheet 1 of the Drawings consisting of Figs. 1-5 should be deleted and replaced with the attached page consisting of Fig. 1.

Signed and Sealed this

Sixth Day of October, 1992

Attest:

DOUGLAS B. COMER

Attesting Officer

Acting Commissioner of Patents and Trademarks